United States Patent [19]
Hollander et al.

[11] Patent Number: 5,524,984
[45] Date of Patent: *Jun. 11, 1996

[54] METHOD AND APPARATUS FOR MEASURING TEMPERATURE USING INFARED TECHNIQUES

[76] Inventors: Milton B. Hollander, One Arbor Rd., Stamford, Conn. 06903; W. Earl McKinley, 77 Knox Rd., Stamford, Conn. 06907

[ * ] Notice: The term of this patent shall not extend beyond the expiration date of Pat. No. 5,368,392.

[21] Appl. No.: 348,978

[22] Filed: Nov. 28, 1994

Related U.S. Application Data

[63] Continuation of Ser. No. 121,916, Sep. 17, 1993, Pat. No. 5,368,392.

[51] Int. Cl.$^6$ .............................. G01K 1/00; G01J 5/02; G01B 11/00; F21V 21/30
[52] U.S. Cl. .............. 374/121; 374/120; 374/141; 33/241; 33/DIG. 21; 362/35; 362/259; 356/49; 356/399
[58] Field of Search ................... 374/120, 121, 374/141, 124, 208; 33/241, DIG. 21; 362/35, 259; 356/49, 399

[56] References Cited

U.S. PATENT DOCUMENTS

| | | | |
|---|---|---|---|
| 4,315,150 | 2/1982 | Darringer et al. | 374/130 |
| 4,494,881 | 1/1985 | Everest | 374/121 |
| 4,576,432 | 3/1986 | Ruger | 374/124 |
| 4,626,686 | 12/1986 | Pompei et al. | 374/124 |
| 5,085,525 | 2/1992 | Bartosiak et al. | 374/124 |
| 5,172,978 | 12/1992 | Nomura et al. | 374/121 |

*Primary Examiner*—Diego F. F. Gutierrez
*Attorney, Agent, or Firm*—Grimes & Battersby

[57] ABSTRACT

Method and apparatus are provided for visibly outlining the energy zone to be measured by a radiometer. The method comprises the steps of providing a laser sighting device on the radiometer adapted to emit at least one laser beam against a surface whose temperature is to be measured and positioning said laser beam about the energy zone to visibly outline said energy zone. The apparatus comprises a laser sighting device adapted to emit at least one laser beam against the surface and means to position said laser beam about the energy zone to visibly outline said energy zone.

26 Claims, 4 Drawing Sheets

METHOD AND APPARATUS FOR MEASURING TEMPERATURE USING INFARED TECHNIQUES

This is a continuation of patent application Ser. No. 08/121,916, filed Sep. 17, 1993, now U.S. Pat. No. 5,368, 392.

BACKGROUND OF THE INVENTION

1. Field of the Invention

The present invention relates generally to a method and apparatus for more accurately measuring the temperature of a surface using infrared measurement techniques and, more particularly, to such a method and apparatus which utilizes a circumscribing laser sighting beam or beams for more clearly defining the periphery of the energy zone from which the temperature is measured. Generally speaking, this accomplished by rotating the laser beam about the periphery of the energy zone; by the use of two or more stationery laser beams which are focused on the periphery of the energy zone; or by the use of a controlled single laser beam directed towards two or more predetermined locations on the periphery of the energy zone.

2. Description of the Prior Art

Remote infrared temperature measuring devices (commonly referred to as infrared pyrometers or radiometers) have been used for many years to measure the temperature of a surface from a remote location. Their principle of operation is well known. All surfaces at a temperature above absolute zero emit heat in the form of radiated energy. This radiated energy is created by molecular motion which produces electromagnetic waves. Thus, some of the energy in the material is radiated in straight lines away from the surface of the material. Many infrared radiometers use optical reflection and/or refraction principles to capture the radiated energy from a given surface. The infrared radiation is focused upon a detector, analyzed and, using well known techniques, the surface energy is collected, processed and the temperature is calculated and displayed on an appropriate display.

Examples of such infrared radiometers are illustrated at pages J-1 through J-42 of the *Omega Engineering Handbook*, Volume 2B. See, also, U.S. Pat. No. 4,417,822 which issued to Alexander Stein et al. on Nov. 29, 1983 for a Laser Radiometer; U.S. Pat. No. 4,527,896 which issued to Keikhosrow Irani et al. on Jul. 9, 1985 for an Infrared Transducer-Transmitter for Non-Contact Temperature Measurement; and U.S. Pat. No. 5,169,235 which issued to Hitoshi Tominaga et al. for Radiation Type Thermometer on Dec. 8, 1992. Also see Baker, Ryder and Baker, Volume II, *Temperature Measurement in Engineering*, Omega Press, 1975, Chapters 4 and 5.

When using such radiometers to measure surface temperature, the instrument is aimed at a target or "spot" within the energy zone on the surface on which the measurement is to be taken. The radiometer receives the emitted radiation through the optical system and is focused upon an infrared sensitive detector which generates a signal which is internally processed and converted into a temperature reading which is displayed.

The precise location of the energy zone on the surface as well as its size are extremely important to insure accuracy and reliability of the resultant measurement. It will be readily appreciated that the field of view of the optical systems of such radiometers is such that the diameter of the energy zone increases directly with the distance to the target. The typical energy zone of such radiometers is defined as where 90% of the energy focused upon the detector is found. Heretofore, there have been no means of accurately determining the size of the actual energy zone unless it is approximated by the use of a "distance to target table" or by actual physical measurement.

Target size and distance are critical to the accuracy of most infrared thermometers. Every infrared instrument hs a field of view (FOV), an angle of vision in which it will average all the temperatures which it sees. Field of view is described either by its angle or by a distance to size ratio (D:S). If the D:S=20:1, and if the distance to the object divided by the diameter of the object is exactly 20, then the object exactly fills the instruments's field of view. A D:S ratio of 60:1 equals a field of view of 1 degree.

Since most IR thermometers have fixed-focus optics, the minimum measurement spot occurs at the specified focal distance. Typically, if an instrument has fixed-focus optics with a 120:1 D:S ratio and a focal length of 60" the minimum spot (resolution) the instrument can achieve is 60 divided by 120, or 0.5" at a distance of 60" from the instrument. This is significant when the size of the object is close to the minimum spot the instrument can measure.

Most general-purpose IR thermometers use of focal distance of between 20" and 60" (50 and 150 cm); special close-focus instruments use a 0.5" to 12" focal distance. See page Z54 and Z55, Volume 28, *The Omega Engineering Handbook*, Vol. 28.

In order to render such devices more accurate, laser beam sighting devices have been used to target the precise center of the energy zone. See, for example, Pages C1-10 through C1-12 of *The Omega Temperature Handbook*, Vol. 27. Various sighting devices such as scopes with cross hairs have also been used to more accurately identify the center of the energy zone to be measured. See, for example, Pages C1-10 through C1-21 of *The Omega Temperature Handbook*, Vol. 27.

The use of a laser to pinpoint the center of the energy zone does not, however, provide the user with an accurate definition of the actual energy zone from which the measurement is being taken. This inability frequently results in inaccurate readings. For example, in cases where the area from which radiation limits is smaller than the target diameter limitation (too far from or too small a target), inaccurate readings will occur.

One method used to determine the distance to the target is to employ an infrared distance detector or a Doppler effect distance detector or a split image detector similar to that used in photography. However, the exact size of the energy zone must still be known if one is to have any degree of certainty as to the actual area of the surface being measured. This is particularly true if the energy zone is too small or the surface on which the energy zone encompasses is irregular in shape. In the case where the surface does not fill the entire energy zone area, the readings will be low and, thus, in error.

Similarly, if the surface is irregularly shaped, the readings will also be in error since part of the object would be missing from the actual energy zone being measured. Thus, the use of a single laser beam to the apparent center of the energy zone does not insure complete accuracy since the user of the radiometer does not know specifically the boundaries of the energy zone being measured.

As will be appreciated, none of the prior art recognizes this inherent problem let alone offers a solution to the problems created thereby.

SUMMARY OF THE INVENTION

Against the foregoing background, it is a primary object of the present invention to provide a method and apparatus for measuring the temperature of a surface using infrared techniques.

It is another object of the present invention to provide such a method and apparatus which provides more accurate measurement of the surface temperature than by the use of techniques heretofore employed.

It is yet another object of the present invention to provide such a method and apparatus which permits the user to visually identify the energy zone on the surface to be measured.

It is still yet another object of the present invention to provide such method and apparatus which employs a laser beam or beams for clearly outlining the periphery of the energy zone on the surface.

To the accomplishments of the foregoing objects and advantages, the present invention, in brief summary, comprises method and apparatus for visibly outlining the energy zone to be measured by a radiometer. The method comprises the steps of providing a laser sighting device on the radiometer adapted to emit at least one laser beam against a surface whose temperature is to be measured and controlling said laser beam about the energy zone to visibly outline said energy zone. The beam would be controlled in such a fashion where it is directed to predetermined points of the target zone. This can be done mechanically or electrically.

Another embodiment of this invention employs a plurality of laser beams to describe the outline of the energy zone either by splitting the laser beam into a number of points through the use of optical fibers or beam splitters or the use of a plurality of lasers. One embodiment of the apparatus comprises a laser sighting device adapted to emit at least one laser beam against the surface and means to rotate said laser beam about the energy zone to visibly outline said energy zone. This rotation can be by steps or continuous motion.

Another embodiment consists of two or more stationary beams directed to define the energy zone. The two or more laser beams could be derived from a dedicated laser to each beam or by means of beam splitters. This can be accomplished by mirrors, optics and fiber optics.

Another embodiment consists of a laser beam splitting device that emits one laser beam which is split into a plurality of beams that outline the energy zone.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

DESCRIPTION OF THE PREFERRED EMBODIMENTS

Figure 1:
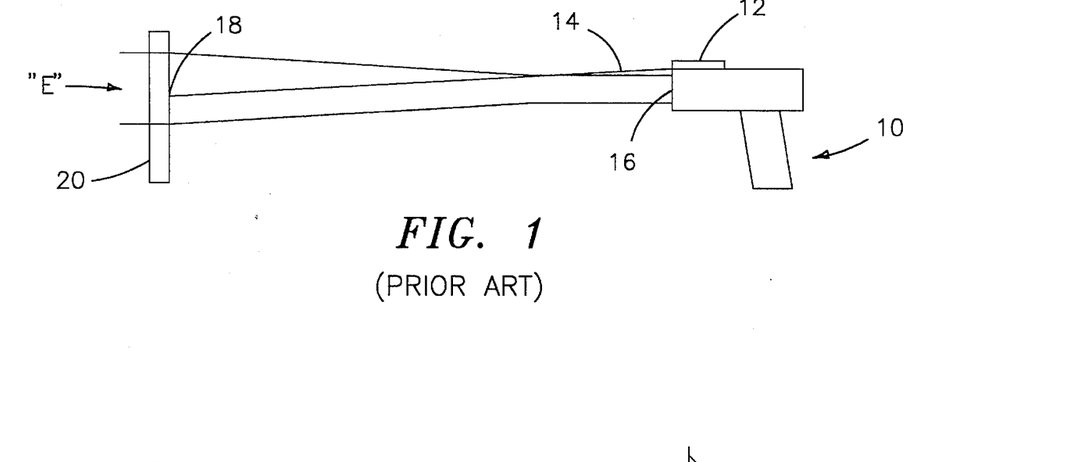
FIG. 1 is a schematic illustration of the prior art type of radiometers using laser sighting devices.

Traditional, prior art radiometers have long employed laser sighting devices to assist in the proper aim and alignment of the instrument. FIG. 1 illustrates the operation of traditional, prior art, hand held radiometers. Such a radiometer, referred to generally by reference numeral 10, include a laser site scope 12 which emits a laser beam 14 to a spot or target 18 on the surface 20 whose temperature is to be measured. This spot 18 is located in the center of the energy zone "E" which is to be measured by the radiometer 10. This spot 18 includes a detector 16 which is connected to conventional internal circuitry and display means (not shown) for conversion, calculation and display of the temperature of the surface 20 calculated indirectly from the energy radiated from the surface within the energy zone E. Such energy is radiated in straight lines in all directions away from the surface 20 and captured with the detector 16 on the radiometer 10. Using infrared radiation principles, the radiometer is thus able to capture and measure the infrared energy in the energy zone E and determine the surface temperature thereof.

The actual size and shape of the energy zone E is determined by the optics of the radiometer and the distance between the radiometer and the target. Each radiometer has a defined angle of vision or "field of view" which is typically identified in the instrument's specification sheet. The size of the energy zone E is predetermined when the field of view is known in conjunction with the distance to the target. Obviously, the further the radiometer is held to the target (i.e., the greater the distance), the larger the energy zone E.

This can be expressed in a "distance to spot size ratio." For example, with a "distance to spot size ratio of 40:1 the periphery of the energy zone would have a 1" diameter at a distance of 40" or, at a distance of 20" the diameter of the energy zone would be ½". The manufacturer of the pyrometer usually provides field of view diagrams for determining the energy zone at specific distances.

As can readily be appreciated, however, such laser aiming devices are merely able to identify the center of the energy zone being measured and not the outer periphery of the actual energy zone from which the measurement is being taken. The farther away from the surface the radiometer 10 is positioned, the larger the energy zone E. Thus, depending upon the size and configuration of the surface 20, the actual energy zone E may, conceivably, include irregular shaped portions of the surface 20 or even extend beyond the edges of the surface. Of course, in such instances, the resultant measured temperature would be inaccurate. Without knowing the outer perimeter of such energy zone E, the user of the radiometer 10 would have no knowledge of such fact or that the resultant readings could be inaccurate.

The present invention provides a means for visibly defining the energy zone E so that the user of the radiometer 10 can observe the actual energy zone being measured to determine where it falls relative to the surface being measured. In the various embodiments of this invention, a fine laser line or lines is projected against the surface being measured and such line or lines is positioned so as to encompass the periphery of the energy zone E. If a rotating laser beam is employed, positioning can be effected, alternatively, by moving either the laser itself or the laser beam emitted from the laser. If the perimeter of the energy zone E could be identified on the object by the movement of the laser beam in a path about the circumference of the energy zone E, the user would be able to quickly and accurately determine if the energy zone from which the measurement was being taken was fully on the surface to be measured and whether its surface was of a type which would provide an otherwise accurate measurement.

The periphery of the energy zone E is identified as a function of the stated "field of view" of the particular radiometer as identified in its specifications and the distance between the radiometer and the target. Identification of the size and shape of the energy zone is easily done using conventional mathematical formulas. Once identified, the laser beam is then projected about the periphery of the energy zone E in accordance with the methods and apparatus hereinafter described. One simple "aiming" approach is to project the laser beam at the same angle as the field of view of the radiometer emulating from the same axis or, alternatively, by mechanically adjusting the laser beam angle in accordance with the "distance to spot size ratio" calculations. In either event, the periphery of the energy zone E would be identified by the laser beam.

Figure 2:
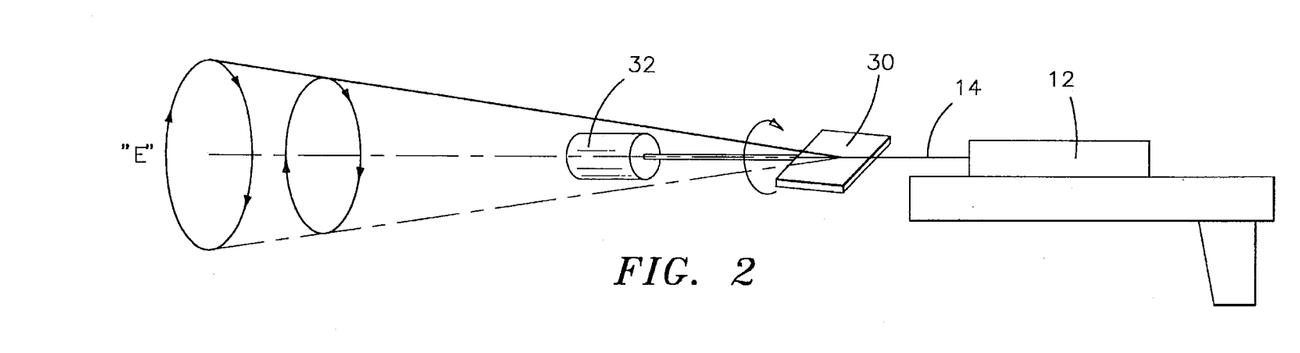
FIG. 2 is a schematic illustration of a preferred embodiment of the present invention in which the laser beam is circumscribing the target zone using a mirror.

FIG. 2 illustrates a first embodiment of the present invention in which the laser aiming device 12 emits a laser beam 14 which is aimed at a mirrored surface 30 which is positioned in front of the laser beam 14. The mirror 30 is rotated using motive means 32 so as to rotate the beam in a circular fashion to define the energy zone E on the surface being measured. Alternatively, the mirror 30 can be rotated by vibratory means or by the application of a magnetic field (not shown). Rotation of the mirror 30 should be at a refraction angle which corresponds to the 90% energy zone E thereby permitting the laser beam 14 to rotate about the periphery of the energy zone E thereby making it visible to the user of the radiometer 10.

Alternatively, a prism can be used in place of the mirror 30 with predetermined angles to cause the prism to function as the reflecting mirror surface and, thereby, direct the laser beam about the perimeter of the energy zone.

Figure 2A:
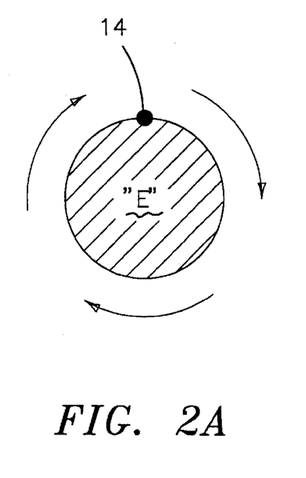
FIGS. 2A and 2B illustrate the manner in which the laser beam is relocated in stepped fashion to identify the energy zone.
Figure 2B:
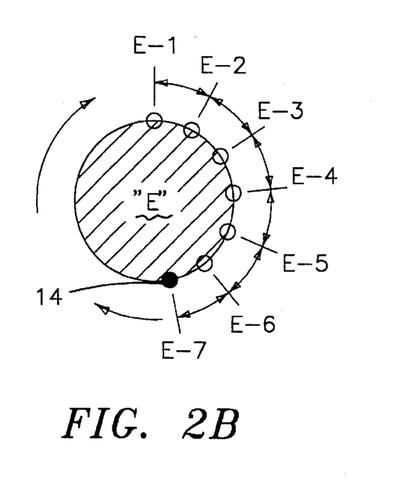

FIGS. 2A and 2B illustrate the manner in which the laser beams can be used to outline the energy zone E on the surface to be measured. It is important that rotation of the beam 14 be carefully controlled so that rotation is at such a speed which can be visually followed. This will permit full beam intensity. As illustrated in FIGS. 2A and 2B, the laser beam is rotated about the energy zone E through a series of steps with the laser beam being permitted to remain in each step for at least one hundredth of a second before moving to its next position. This is accomplished by creating a plurality of steps E-1, E-2 etc., around the energy zone E. The laser beam 114 would stop at each step for the predetermined period of time to permit the beam to be visually observed before moving to the next step.

Figure 3:
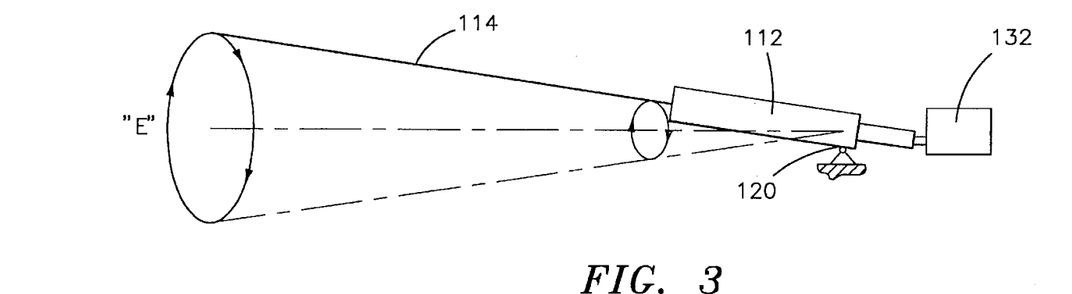
FIG. 3 is a schematic illustration of an alternative embodiment of the present invention in which the laser is pivoted about a pivot point by the use of mechanical motive means.

FIG. 3 illustrates another embodiment of the present invention in which the laser 112 itself is rotated or displaced so as to scribe a circle which defines the energy zone E by mechanically pivoting the laser 112 about pivot point 120 using motive means 132. Alternatively, the laser 112 can be rotated by vibratory means (not shown) or by the application of a magnetic field (not shown). Rotation of the laser 112 should, however, be at a refraction angle which corresponds to the 90% energy zone E thereby permitting the laser beam 114 to rotate about the periphery of the energy zone E to make it visible to the user of the radiometer 10.

Figure 4:
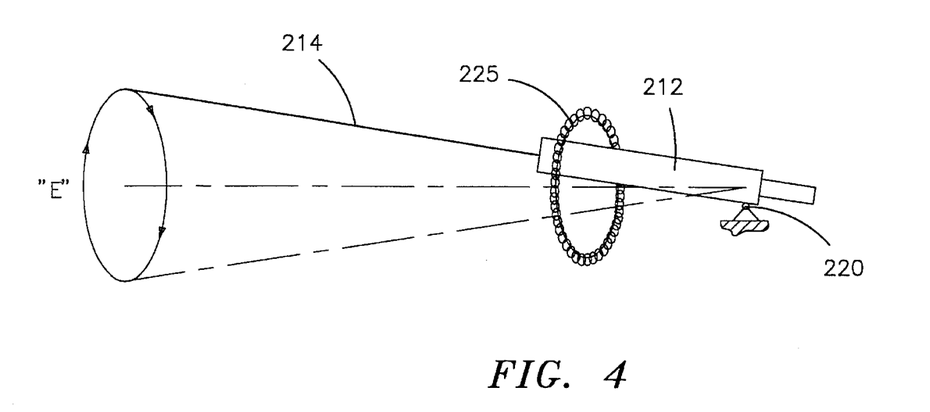
FIG. 4 is a schematic illustration of another alternative embodiment of the present invention in which the laser is directed through a magnetic field to identify the target zone.

In FIG. 4, the laser 212 is rotated about a pivot point 220 by the application of a magnetic field 225 so as cause the emission of the laser beam 214 around the periphery of the 90% energy zone E to make the beam visible to the user of the radiometer 10. In such embodiment, means (not shown) are provided for modifying the magnetic field 225 to correspond to the 90% energy zone so as to permit the laser to be rotated accordingly.

Figures 5, 6:
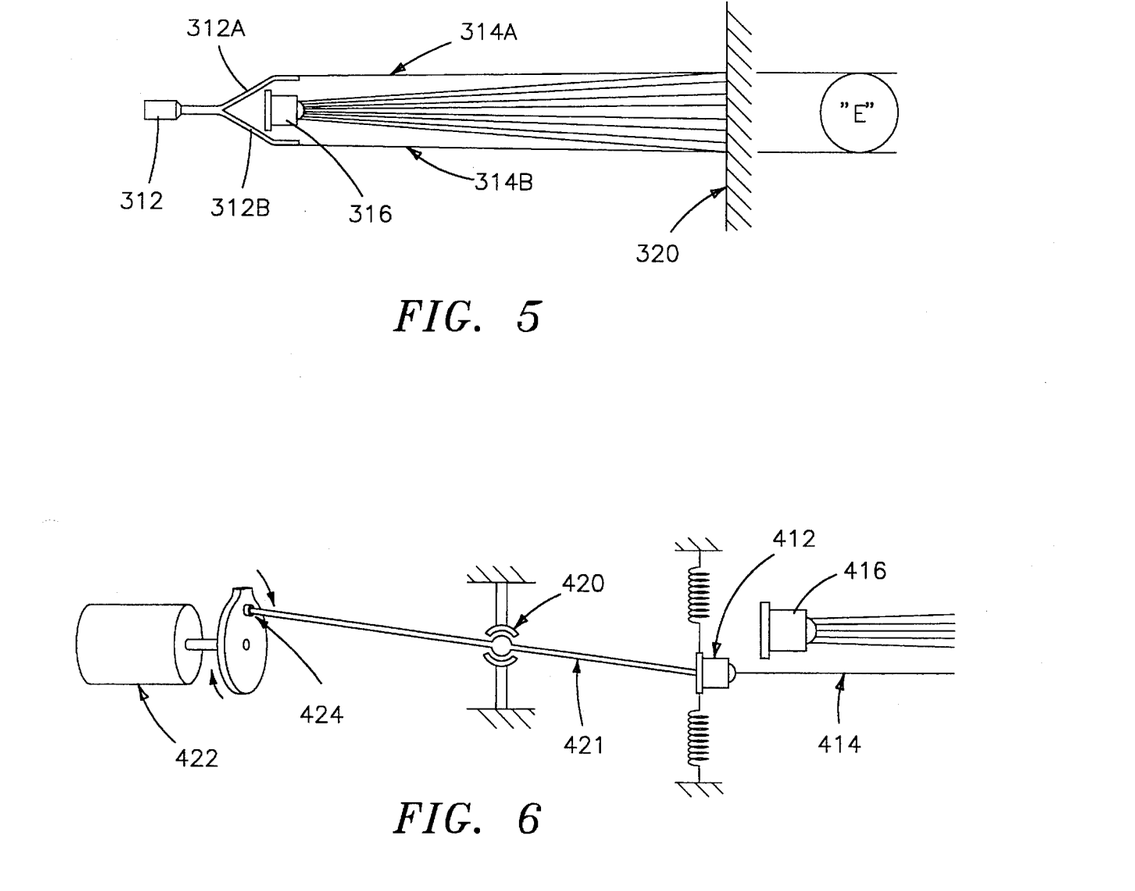
FIG. 5 is a schematic illustration of another alternative embodiment of the present invention in which a number of individual laser beams are projected so as define the energy zone being measured.
FIG. 6 is a schematic illustration of another alternative embodiment of the present invention in which the laser is mechanically pivoted.

In FIG. 5, the laser 312 has at least two components 312A and 312B which produce at least two individual laser beams 314A and 314B about the detector 316. These at least two individual beams 314A and 314B are directed to the surface 320 being measured at the perimeter of the energy zone E rather than at its center. Through the use of a number of such laser beams, the energy zone E becomes clearly identified rather than merely the center of the energy zone E. If desired, individual lasers can be used or laser splitting devices can be used to split a single laser beam.

FIG. 6 illustrates yet another embodiment of the present invention in which the laser 412 is mechanically pivoted in a circular fashion around the detector 416 so as to emit a laser beam 414 in a circular path on the surface (not shown) thereby defining the energy zone E. Laser 412 is pivotally mounted on pivot bearing 420 provided on connecting arm 421. Arm 421 is mounted on pivot bearing 424 which is rotated by motor 422. In such a manner, the laser beam 414 emitted from the laser 412 rotates about and outlines the energy zone E on the surface from which the temperature is being measured.

Figure 7:
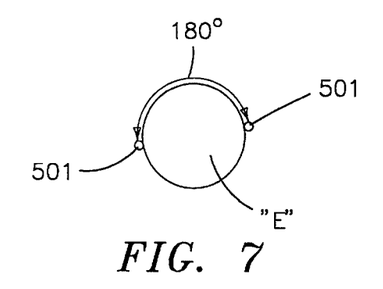
FIG. 7 schematically illustrates the positioning of fiber optics to create a pattern of the target zone with the laser beam.

The rotation of the laser beam may also be effected using fiber optics techniques as shown in FIG. 7 in which the laser beam is projected through fiber optics means 501. In such manner, the beam fans out from the laser source and encircles and thereby defines the energy zone E. By the use of a sufficient number of fiber objects, one can outline the circumference of the target area E with a light ring. This can be accomplished by as few as two fibers 501 positioned 180 degrees apart since the pick up pattern would be circular.

Figure 8:
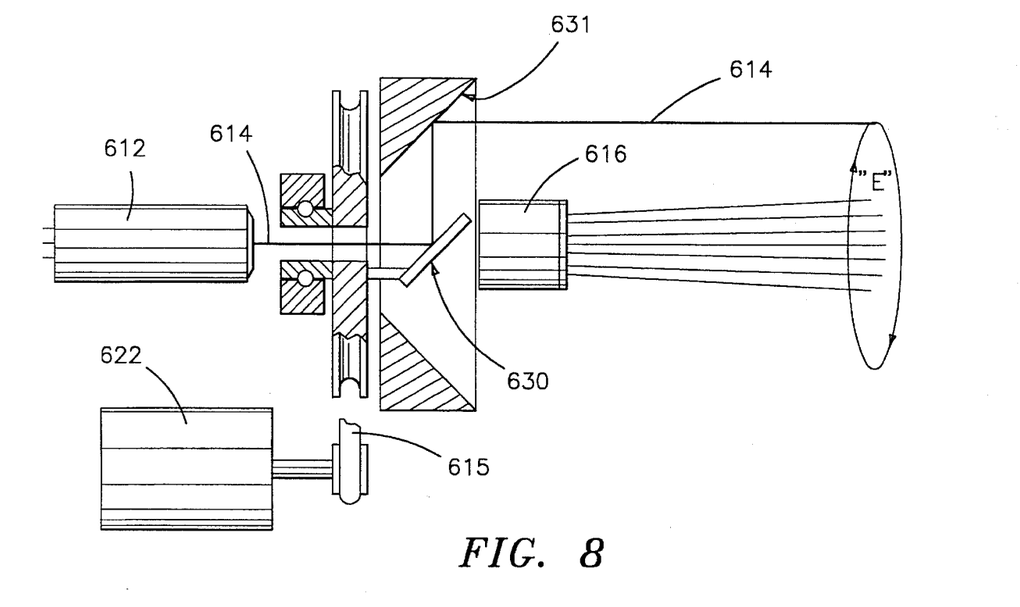
FIG. 8 is a detailed sectional view of the another alternative embodiment of the present invention in which the laser is mechanically pivoted about the detector.

FIG. 8 illustrates still another means of effecting rotation of the laser beam 614 emitted from laser 612. In this manner, the laser beam 614 is directed above detector 616 against a rotating flat surface mirror 630 positioned behind detector 616 where it is reflected against a plated plastic cone mirror 631. The reflected beam is then projected to the surface and defines the perimeter of the energy zone E. The flat mirror 630 is driven by motor 622. In such manner, the laser beam 614 rotates about the circumference of the energy zone E on the surface being measured. The mirrors are positioned at such an angle that the laser projection is at the same angle as the infrared detector pickup angle.

Figure 9A:
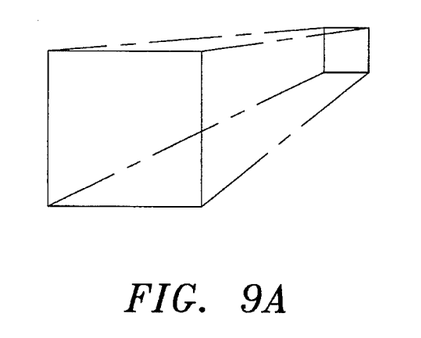
FIGS. 9A–9C illustrate alternative configurations of the targets which can be projected using the apparatus of the present invention.
Figure 9B:
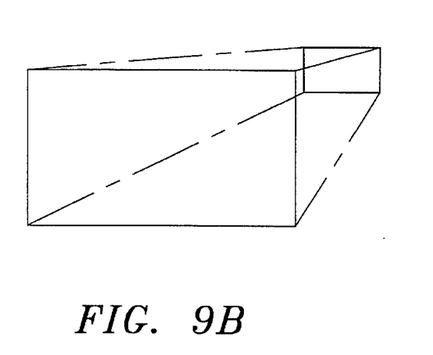
Figure 9C:
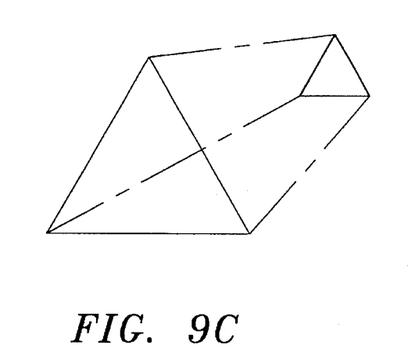

It will, of course, be appreciated that the energy zones E may assume configurations other than the circular configuration shown in FIGS. 1–8. FIGS. 9A–C illustrate alternative square (FIG. 9A), rectangular (FIG. 9B) and triangular (FIG. 9C) configurations for the light patterns which may be accomplished using the means of the present inventions.

Figure 10:
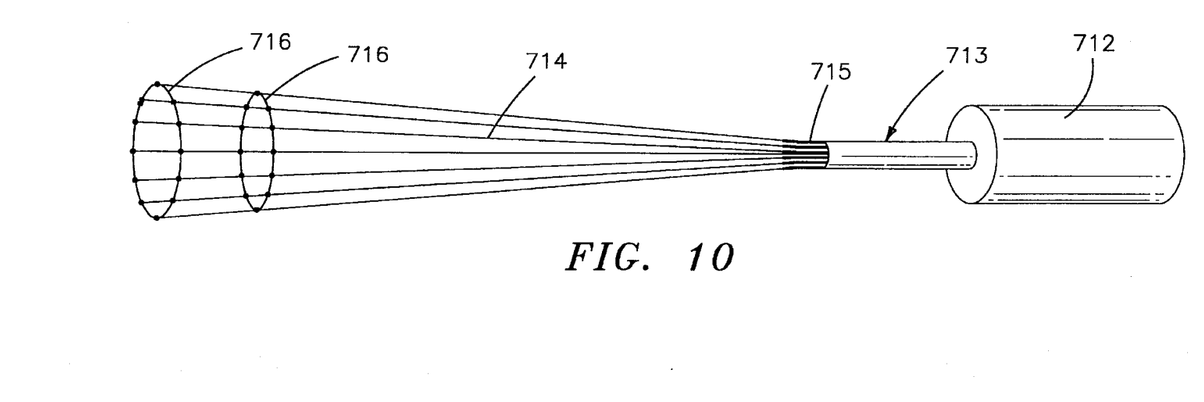
FIG. 10 is a schematic illustration of another embodiment of the invention wherein the laser is divided into a plurality of laser beams defining the energy zone by the use of optical fibers.

FIG. 10 illustrates a method for defining the energy zone where a circular configuration can be accomplished without rotation of the laser beam wherein a plurality of fixed optical fibers positioned to project a number of spots is employed. In this figures, a fixed laser 712 projects a beam 713 which is split into a plurality of beams 714 by a bundle of optical fibers 715 in order to project a pattern 716 onto the surface defining the energy zone E. Additional configurations may also be used, if desired.

Having thus described the invention with particular reference to the preferred forms thereof, it will be obvious that various changes and modifications can be made therein without departing from the spirit and scope of the present invention as defined by the appended claims.

Wherefore, I claim:

1. A method for identifying the extent of a radiation zone on a region whose temperature is to be measured using a radiometer, said method comprising the steps of:

providing a sighting device for use in conjunction with said radiometer, said device including means for generating a laser beam;

splitting said laser beam into at least two components; and directing said at least two components toward said region to identify the extent of said radiation zone.

2. A method for identifying the extent of a radiation zone on an area whose temperature is to be measured using a radiometer, said method comprising the steps of:

providing a sighting device for use in conjunction with said radiometer, said device including means for generating a laser beam;

splitting said laser beam into at least two components; and positioning said at least two components toward said area to identify the extent of said radiation zone.

3. A method for visibly outlining an energy zone on a surface whose temperature is to be measured using a radiometer, said method comprising the steps of:

providing a sighting device for use in conjunction with said radiometer, said device including means for generating a laser beam;

splitting said laser beam into at least two split laser lines; and positioning said at least two laser lines toward said surface to visibly outline the periphery of said energy zone.

4. The method of claim 3, wherein said at least two split laser lines identify the extent of said energy zone.

5. The method of claim 3, wherein said step of splitting comprises the step of passing said laser beam through a beam splitter.

6. The method of claim 3, wherein said step of splitting comprises the step of passing said laser beam through a plurality of fibers.

7. A method for identifying an energy zone whose temperature is to be measured using a radiometer, said method comprising the steps of:

providing a sighting device for use in conjunction with said radiometer, said device including means for generating a laser beam;

splitting said laser beam into at least two split laser lines;

directing said at least two laser lines toward said zone; and positioning said laser lines to identify the periphery of said zone.

8. A method for visibly outlining an energy zone on a surface whose temperature is to be measured using a radiometer, said method comprising the steps of:

providing a sighting device for use in conjunction with said radiometer, said device including means for generating a laser beam;

splitting said laser beam into at least two split laser lines;

directing said at least two laser lines toward said surface; and positioning said laser lines to visibly outline the periphery of said energy zone.

9. The method of claim 8, wherein said step of splitting comprises the step of passing said laser beam through a beam splitter.

10. The method of claim 8, wherein said at least two split laser lines identify the extent of said energy zone.

11. Apparatus for use in conjunction with a radiometer for identifying a radiation zone in an area whose temperature is to be measured using said radiometer, said apparatus comprising a laser sighting device for use in conjunction with said radiometer, said laser sighting device including:

means for generating a laser beam;

means for splitting said laser beam into at least two components; and means for positioning said at least two components to identify the extent of said radiation zone.

12. Apparatus for use in conjunction with a radiometer for visibly outlining an energy zone on a surface whose temperature is to be measured using said radiometer, said apparatus comprising a laser sighting device for use in conjunction with said radiometer, said laser sighting device including:

means for generating a laser beam;

means for splitting said laser beam into at least two split laser lines; and means for directing said at least two laser lines toward said surface; and means for positioning said at least two components to visibly outline the periphery of said energy zone.

13. The apparatus of claim 12, wherein said means for splitting comprises a beam splitter adapted to split said laser beam into at least two laser lines.

14. The apparatus of claim 13, wherein said beam splitter comprises a bundle of fibers.

15. Apparatus for use in conjunction with a radiometer for identifying the extent of an energy zone whose temperature is to be measured using said radiometer, said apparatus comprising a laser sighting device cooperating with said radiometer for emitting at least one laser beam toward said energy zone along a path and means for adjusting the path of said laser beam to outline only the periphery of said energy zone.

16. Apparatus for measuring the intensity of detected radiation, comprising:

a radiation detector having a power supply and means for measuring the intensity of said detected radiation;

a separate laser beam generator for directing at least two laser beams along several axes in the direction of the radiation to be detected so as to define the limits of the zone of radiation to be measured; and means for integrating the detected radiation intensity measurement and the zone of radiation as defined by the at least two laser beams.

17. A method for identifying an energy zone whose temperature is to be measured using a radiometer, said method comprising the steps of:

providing a laser sighting device;

causing said sighting device to emit at least one laser beam toward said surface along a path;

adjusting the path of said at least one laser beam to visibly outline only the periphery of said energy zone.

18. The method of claim 17, wherein said step of adjusting the path of said laser beam comprises the step of passing said laser beam through a prism.

19. The method of claim 17, wherein said step of adjusting the path of said laser beam comprises the step of passing said laser beam through a beam splitter.

20. The method of claim 17, wherein said step of adjusting the path of said laser beam comprises the step of mechanically pivoting said laser sighting device.

21. The method of claim 17, wherein said step of adjusting the path of said laser beam comprises the steps of aiming said laser beam at a mirror and rotating said mirror to cause said laser beam to visibly outline only the periphery of said energy zone.

22. Apparatus for identifying an energy zone whose temperature is to be measured using a radiometer, said apparatus including:

a laser sighting device for emitting a laser beam toward said surface; and means for adjusting the path of said laser beam to visibly outline only the periphery of said energy zone.

23. The apparatus of claim 22, wherein said means for adjusting the path of said laser beam comprises a prism through which said laser beam is directed.

24. The apparatus of claim 22, wherein said means for adjusting the path of said laser beam comprises a beam splitter through which the laser beam is directed.

25. The apparatus of claim 22, wherein said means for adjusting the path of said laser beam comprises means for mechanically pivoting the laser sighting device.

26. The apparatus of claim 22, wherein said means for adjusting the path of said laser beam comprises a mirror for directing the path of said laser beam and means for rotating said mirror to cause said laser beam to visibly outline only the periphery of said energy zone.

* * * * *

(12) REEXAMINATION CERTIFICATE (4574th)
United States Patent
Hollander et al.

(10) Number: US 5,524,984 C1
(45) Certificate Issued: May 14, 2002

(54) METHOD AND APPARATUS FOR MEASURING TEMPERATURE USING INFRARED TECHNIQUES

(75) Inventors: Milton B. Hollander; W. Earl McKinley, both of Stamford, CT (US)

(73) Assignee: Omega Engineering, Inc., Stamford, CT (US)

Reexamination Request:
No. 90/004,945, Mar. 19, 1998

Reexamination Certificate for:
Patent No.: 5,524,984
Issued: Jun. 11, 1996
Appl. No.: 08/348,978
Filed: Nov. 28, 1994

(*) Notice: This patent is subject to a terminal disclaimer.

Related U.S. Application Data (63) Continuation of application No. 08/121,916, filed on Sep. 17, 1993, now Pat. No. 5,368,392.

(51) Int. Cl.⁷ ............................ G01K 1/00; G01J 5/02; G01B 11/00; F21V 21/30
(52) U.S. Cl. .................. 374/121; 374/120; 374/141; 33/241; 33/DIG. 21; 362/35; 362/259; 356/49; 356/399
(58) Field of Search .................. 374/121, 120, 374/141; 356/399; 250/491.1

(56) References Cited

U.S. PATENT DOCUMENTS

| | | | | | |
|---|---|---|---|---|---|
| 4,315,150 | A | * | 2/1982 | Darringer et al. | 374/130 |
| 4,494,881 | A | * | 1/1985 | Everest | 374/121 |
| 4,576,432 | A | * | 3/1986 | Ruger | 374/124 |
| 4,582,426 | A | | 4/1986 | Douglas | 356/43 |
| 4,626,686 | A | * | 12/1986 | Pompei et al. | 374/124 |
| 5,085,525 | A | * | 2/1992 | Bartosiak et al. | 374/124 |
| 5,172,978 | A | * | 12/1992 | Nomura et al. | 374/121 |

FOREIGN PATENT DOCUMENTS

| | | | |
|---|---|---|---|
| DE | 3213955 | 10/1982 | |
| GB | 2 203 537 | * 10/1988 | |
| JP | 57-22521 | * 2/1982 | 374/121 |
| JP | 62-12848 | 2/1982 | 374/121 |

* cited by examiner

*Primary Examiner*—Andrew Hirshfeld (57) ABSTRACT

Method and apparatus are provided for visibly outlining the energy zone to be measured by a radiometer. The method comprises the steps of providing a laser sighting device on the radiometer adapted to emit at least one laser beam against a surface whose temperature is to be measured and positioning said laser beam about the energy zone to visibly outline said energy zone. The apparatus comprises a laser sighting device adapted to emit at least one laser beam against the surface and means to position said laser beam about the energy zone to visibly outline said energy zone.

ID US 5,524,984 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 28–48:

Traditional, prior art radiometers have long employed laser sighting devices to assist in the proper aim and alignment of the instrument. FIG. 1 illustrates the operation of traditional, prior art, hand held radiometers. Such a radiometer, referred to generally by reference numeral 10, include a laser site scope 12 which emits a laser beam 14 to a spot or target 18 on the surface 20 whose temperature is to be measured. This spot 18 is located in the center of the energy zone "E" which is to be measured by the radiometer 10. This spot 18 [includes] *excites* a detector 16 which is connected to conventional internal circuitry and display means (not shown) for conversion, calculation and display of the temperature of the surface 20 calculated indirectly from the energy radiated from the surface within the energy zone E. Such energy is radiated in straight lines in all directions away from the surface 20 and captured with the detector 16 on the radiometer 10. Using infrared radiation principles, the radiometer is thus able to capture and measure the infrared energy in the energy zone E and determine the surface temperature thereof.

AS A RESULT OF REEXAMINATION, IT HAS BEEN DETERMINED THAT:

The patentability of claims 5, 6 and 9 is confirmed.

Claims 15–26 are cancelled.

Claims 1, 2, 3, 4, 7, 8, 10, 11, 12 and 13 are determined to be patentable as amended.

Claim 14, dependent on an amended claim, is determined to be patentable.

1. A method for identifying the extent of a radiation zone on a region whose temperature is to be measured using a radiometer, said method comprising the steps of:
   providing a sighting device for use in conjunction with said radiometer, said device including means for generating a laser beam;
   splitting said laser beam into [at least] *more than* two components; and
   directing [said at least] *simultaneously said more than* two components toward said region to identify the extent of said radiation zone.

2. A method for identifying the extent of a radiation zone on an area whose temperature is to be measured using a radiometer, said method comprising the steps of:
   providing a sighting device for use in conjunction with said radiometer, said device including means for generating a laser beam;
   splitting said laser beam into [at least] *more than* two components; and
   positioning *simultaneously* said [at least] *more than* two components toward *and on* said area to identify the extent of said radiation zone.

3. A method for visibly outlining an energy zone on a surface whose temperature is to be measured using a radiometer, said method comprising the steps of:
   providing a sighting device for use in conjunction with said radiometer, said device including means for generating a laser beam;
   splitting said laser beam into [at least] *more than* two split laser lines; and
   positioning *simultaneously* said [at least] *more than* two laser lines toward *and on* said surface to [visibly] outline *visibly* the periphery of said energy zone.

4. The method of claim 3, wherein said [at least] *more than* two split laser lines identify the extent of said energy zone.

7. A method for identifying an energy zone whose temperature is to be measured using a radiometer, said method comprising the steps of:
   providing a sighting device for use in conjunction with said radiometer, said device including means for generating a laser beam;
   splitting said laser beam into [at least] *more than* two split laser lines;
   directing said [at least] *more than* two laser lines toward said zone, and
   positioning *simultaneously on said zone* said laser lines to identify the periphery of said zone.

8. A method for visibly outlining an energy zone on a surface whose temperature is to be measured using a radiometer, said method comprising the steps of:
   providing a sighting device for use in conjunction with said radiometer, said device including means for generating a laser beam;
   splitting said laser beam into [at least] *more than* two split laser lines;
   directing [said at least] *simultaneously said more than* two laser lines toward said surface; and
   positioning said laser lines *on said zone* to *outline* visibly [outline] the periphery of said energy zone.

10. The method of claim 8, wherein said [at least] *more than* two split laser lines identify the extent of said energy zone.

11. Apparatus for use in conjunction with a radiometer for identifying a radiation zone in an area whose temperature is to be measured using said radiometer, said apparatus comprising a laser sighting device for use in conjunction with said radiometer, said laser sighting device including:
   means for generating a laser beam;
   means for splitting said laser beam into [at least] *more than* two components; and
   means for positioning *simultaneously* said [at least] *more than* two components *on said zone* to identify the extent of said radiation zone.

12. Apparatus for use in conjunction with a radiometer for visibly outlining an energy zone on a surface whose tem perature is to be measured using said radiometer, said apparatus comprising a laser sighting device for use in conjunction with said radiometer, said laser sighting device including:

means for generating a laser beam;

means for splitting said laser beam into [at least] *more than* two split laser lines; and     means for directing said [at least] *more than* two laser lines toward said surface; and     means for positioning [said at least two components] *simultaneously said more than two lines on said zone* to *outline* visibly [outline] the periphery of said energy zone.

13. The apparatus of claim 12, wherein said means for splitting comprises a beam splitter adapted to split said laser beam into [at least] *more than* two laser lines.

\* \* \* \* \*